(12) United States Patent
Shaull et al.

(10) Patent No.: US 10,006,654 B2
(45) Date of Patent: Jun. 26, 2018

(54) NFC CONFIGURATION OF HVAC EQUIPMENT

(71) Applicant: KMC Controls, Inc., New Paris, IN (US)

(72) Inventors: Randall L. Shaull, Granger, IN (US); Erich J. Kreuter, Goshen, IN (US); Bradley E. Kehler, New Paris, IN (US); Rodney Harruff, Concord, NC (US); Gregory A. Zuercher, South Whitley, IN (US); David P. Bohlmann, Granger, IN (US); Matthew T. Merrick, Goshen, IN (US); Richard G. San Giacomo, Leo, IN (US)

(73) Assignee: KMC Controls, Inc., New Paris, IN (US)

(*) Notice: Subject to any disclaimer, the term of this patent is extended or adjusted under 35 U.S.C. 154(b) by 263 days.

(21) Appl. No.: 14/939,577

(22) Filed: Nov. 12, 2015

(65) Prior Publication Data
US 2016/0138821 A1  May 19, 2016

Related U.S. Application Data

(60) Provisional application No. 62/079,619, filed on Nov. 14, 2014.

(51) Int. Cl.
  *F24F 11/00* (2018.01)
  *G05B 15/02* (2006.01)
  (Continued)

(52) U.S. Cl.
  CPC ........... *F24F 11/006* (2013.01); *F24F 11/30* (2018.01); *F24F 11/62* (2018.01); *G05B 15/02* (2013.01); *H04W 4/80* (2018.02)

(58) Field of Classification Search
  CPC ........ F24F 11/006; H04W 4/008; G05B 15/02
  See application file for complete search history.

(56) References Cited

U.S. PATENT DOCUMENTS

| 7,222,800 B2 * | 5/2007 | Wruck | ................. C09D 5/4492 |
| | | | 165/11.1 |
| 7,987,247 B2 | 7/2011 | Westphal et al. | |

(Continued)

OTHER PUBLICATIONS

"NFC for embedded applications", Aug. 2014, NXP Semiconductors N.V., file:///C:/Users/ckasenge/Documents/e-Red%20Folder/14939577/NFC_for_embedded_applications.pdf.*

(Continued)

*Primary Examiner* — Charles Kasenge
(74) *Attorney, Agent, or Firm* — Shewchuk IP Services, LLC; Jeffrey D. Shewchuk (57) ABSTRACT

A heating, ventilation and air conditioning ("HVAC") controller has near field communication ("NFC") capability and allows communications with an NFC-enabled PC, Tablet or Smartphone device, allowing initial configuration to be performed with or without building power being supplied to the controller. The NFC transmitted information is a subset of all the configuration settings, arranged in a particular order from most commonly changed to least commonly changed. After building power has been connected, firmware on the HVAC controller then combines the NFC transmitted initial configuration information with other stored or received configuration information so the HVAC controller properly communicates and carries out applications in the HVAC network and system.

28 Claims, 6 Drawing Sheets

(51) Int. Cl.
*H04W 4/00* (2018.01)
*F24F 11/30* (2018.01)
*F24F 11/62* (2018.01)
*H04W 4/80* (2018.01)

(56) References Cited

U.S. PATENT DOCUMENTS

| | | | |
|---|---|---|---|
| 8,437,276 B2 | 5/2013 | Dinur | |
| 9,587,848 B2* | 3/2017 | Adamik | |
| 2012/0178367 A1* | 7/2012 | Matsumoto | G06K 19/0707 455/41.1 |
| 2012/0324119 A1* | 12/2012 | Imes | F24F 11/006 709/227 |
| 2013/0054863 A1* | 2/2013 | Imes | H04L 12/2827 710/304 |
| 2014/0191848 A1* | 7/2014 | Imes | H04B 5/0037 340/10.5 |
| 2015/0019736 A1* | 1/2015 | Imes | H04L 12/2827 709/226 |
| 2015/0026316 A1* | 1/2015 | Imes | F24F 11/006 709/220 |
| 2015/0159895 A1* | 6/2015 | Quam | F24F 11/006 700/275 |
| 2015/0159899 A1* | 6/2015 | Bergman | F24F 11/006 700/276 |
| 2015/0159900 A1* | 6/2015 | Quam | F24F 11/006 700/276 |
| 2015/0159901 A1* | 6/2015 | Quam | F24F 11/006 700/276 |
| 2015/0159902 A1* | 6/2015 | Quam | F24F 11/006 700/278 |
| 2015/0159903 A1* | 6/2015 | Marak | F24F 11/006 700/278 |
| 2015/0159904 A1* | 6/2015 | Barton | F24F 11/006 236/1 C |
| 2015/0160633 A1* | 6/2015 | Adamik | F24F 11/006 362/555 |
| 2015/0163631 A1* | 6/2015 | Quam | F24F 11/006 455/456.1 |
| 2015/0163945 A1* | 6/2015 | Barton | F24F 11/006 361/809 |
| 2015/0195100 A1* | 7/2015 | Imes | H04L 12/282 455/420 |
| 2015/0276237 A1* | 10/2015 | Daniels | F24D 19/10 237/2 A |
| 2015/0276238 A1* | 10/2015 | Matsuoka | G05B 15/02 700/278 |
| 2015/0276239 A1* | 10/2015 | Fadell | G05D 23/1905 237/2 A |
| 2015/0276266 A1* | 10/2015 | Warren | H04W 4/005 700/300 |

OTHER PUBLICATIONS

Smyers, Ken, "2020 Thermostat Odyssey: Picking a Smart Thermostat for Stanley Kubrick's House", Mar. 13, 2014, Control Trends, http://controltrends.org/tag/vivint-smart-thermostat/.*
"EverSence—NFC", Apr. 25, 2013, Leng Bing, https://www.youtube.com/watch?v=pFy_AMWSNTk.*
ST Micro Devices, "AN3375 Application Note", Apr. 2011.
ST Micro Devices, "NFC Memories and Transceivers", Jun. 2014.
ST Micro Devices, "M24LR64E-R", Jun. 2012.
ST Micro Devices, "AN3408 Application Note", Nov. 2012.
ST Micro Devices, "AN3163 Application Note", Oct. 2012.

* cited by examiner

NFC CONFIGURATION OF HVAC EQUIPMENT

CROSS-REFERENCE TO RELATED APPLICATION(S)

The present application claims the benefit of U.S. provisional patent application Ser. No. 62/079,619 filed Nov. 14, 2015. The contents of U.S. provisional patent application Ser. No. 62/079,619 are hereby incorporated by reference in entirety.

BACKGROUND OF THE INVENTION

Control devices such as thermostats and heating, ventilation and air conditioning ("HVAC") controllers require configuration before operating in a particular application. This configuring is typically accomplished at 1) the factory, 2) the user's office, 3) at the job site, or 4) a combination of the above. U.S. Pat. No. 7,987,247, entitled BACnet Protocol MS/TP Automatic MAC Addressing, is incorporated by reference as disclosing one part of configuring.

In any case, a physical communications connection is usually required and power is applied to the device being configured. This means that the control device must be physically removed from the shipping box, wired to power and hooked up to a communications cable. In some cases, such as a thermostat or wallstat with display and keypad, the user would configure the unit by navigating through a series of screens and manually selecting configuration settings on the device. In the case of a device without a display and keypad, the user would enter configure the device with a separate computing device via a communications connection.

Near Field Communications ("NFC") is a technology used to communicate with devices in a short range scenario. Current commercial uses are most typically Point Of Sale (POS) to exchange user credit information with retail outlets to complete a sales transaction. NFC uses the 13.56 MHZ frequency spectrum and is defined primarily, though perhaps not exclusively, by ISO 18000-3 and ISO 13157 and ISO 15693. NFC chips, antennas and readers are commercially offered by companies such as ST Microelectronics.

BRIEF SUMMARY OF THE INVENTION

The present invention incorporates NFC integrated circuits into HVAC controller products and allows configuration and communications of the controllers with a PC, Tablet or Smartphone device. Key to this technology is the ability to communicate with the HVAC device with or without building power being supplied to the device. This allows an end user (typically an installer) to pull and display information about the HVAC device and to configure the HVAC device with specific information written to an NFC EEPROM before building power has been wired to the controller device. The configuration parameters stored on the NFC EEPROM are a limited subset of all the configuration parameters, generally ordered from most commonly changed to least commonly changed. After building power has been applied, communications with the NFC EEPROM can proceed either through NFC or through a wired (I²C) connection.

BRIEF DESCRIPTION OF THE DRAWINGS

FIG. 6 is a first schematic flow chart showing an exemplary configuration procedure in accordance with the present invention. In FIG. 6, light arrows denote communications or electrical connection, with dashed lines indicating optional communications, and darker arrows denote the order of more active, physical steps taken by the user/installer.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF PREFERRED EMBODIMENT(S)

Figure 1:
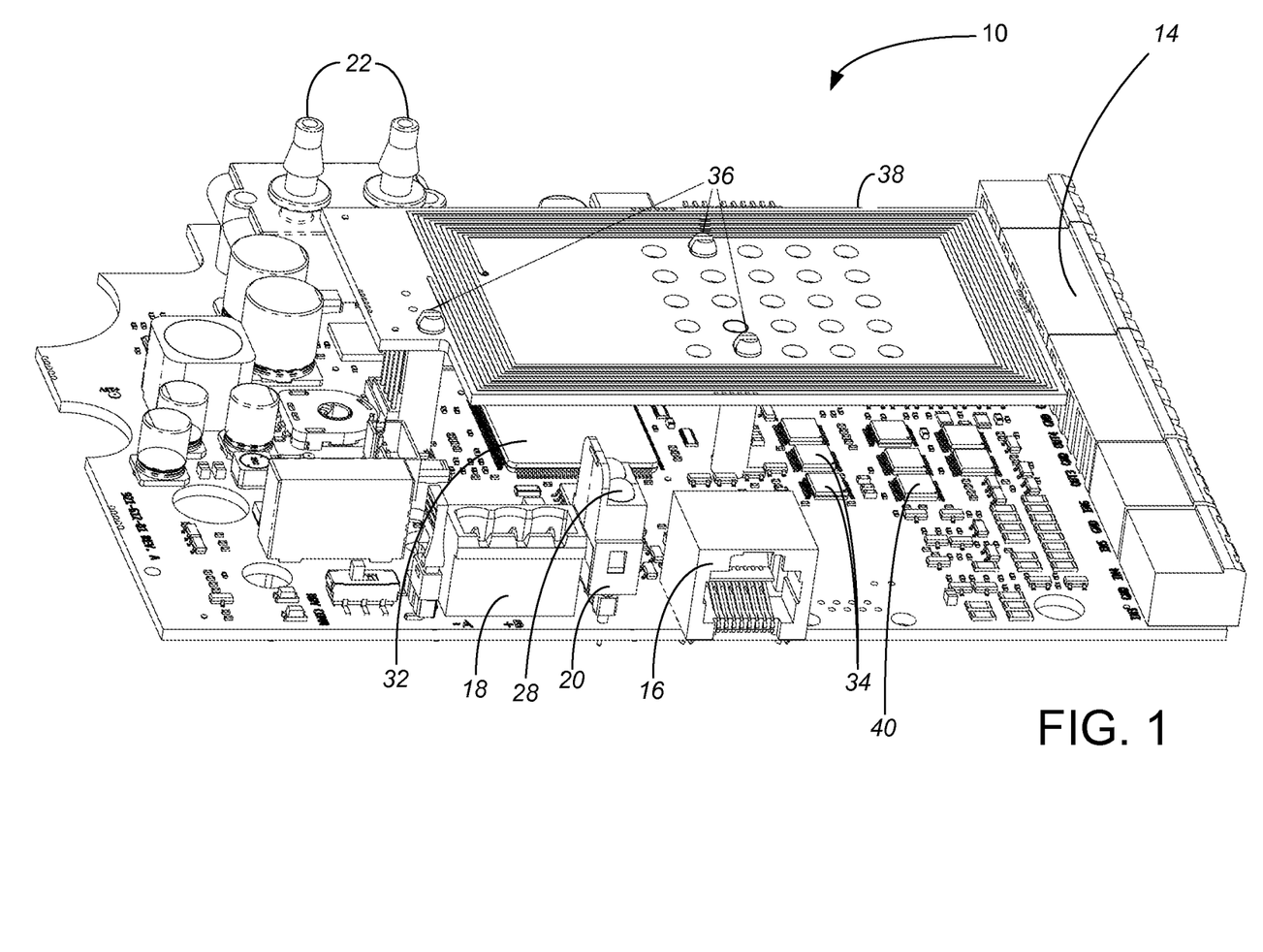
FIG. 1 is a perspective view of circuit board including an NFC integrated circuit and antenna for use in an HVAC device in accordance with the present invention.
Figure 2:
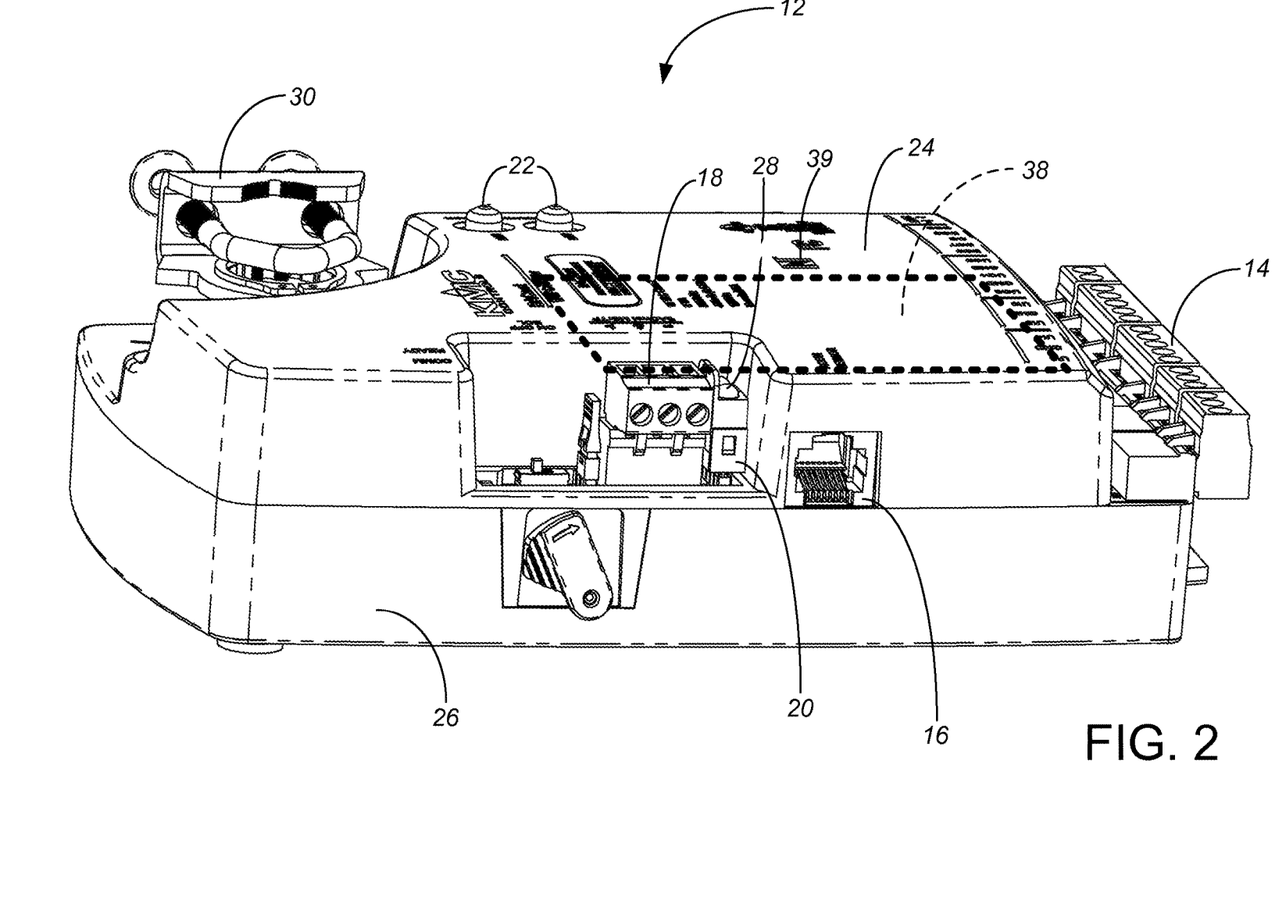
FIG. 2 is a perspective view showing a controller-actuator in accordance with the present invention using the circuit board of FIG. 1.

FIG. 1 shows a preferred circuit board 10 in accordance with the present invention. The particular circuit board 10 depicted is for use in a controller-actuator 12 shown in FIG. 2, representing one type of HVAC device which can incorporate the present invention.

Figure 6:
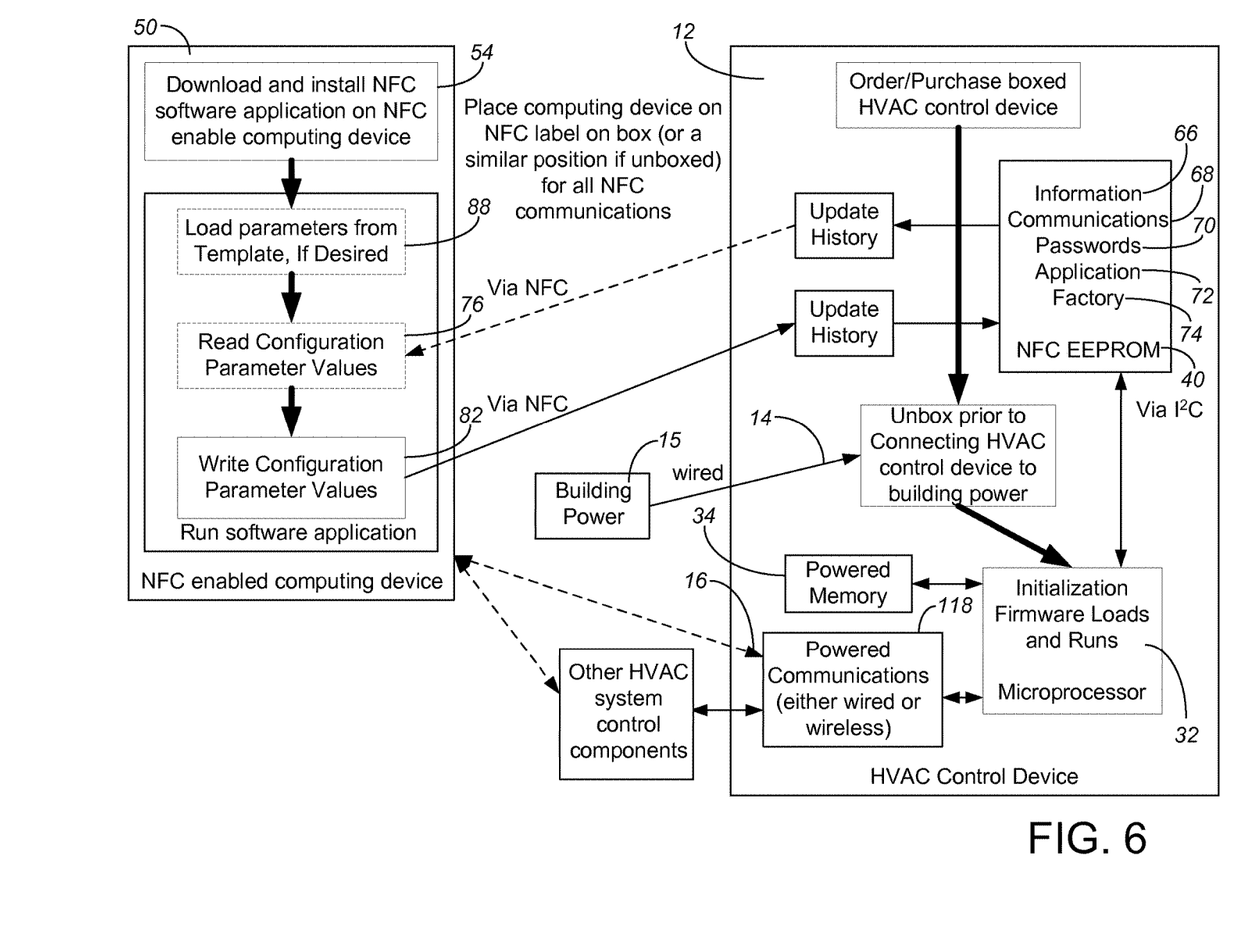

The controller-actuator 12 includes a terminal block 14 for connection to building power 15 (shown in FIG. 6). While the building power 15 could be a 120V or 220V AC circuit, the building power 15 will more preferably be a 24V DC or even more preferably be a 24V AC circuit commonly used in HVAC control systems. The terminal block 14 on the controller-actuator 12 also includes several additional connection points, commonly used in controlling the controller-actuator 12 and gathering data, such as from a temperature sensor or thermostat (not shown), to/from a controller (not shown), etc. For instance, in addition to the power terminals, the preferred controller-actuator 12 includes eight input terminals (internal actuator position feedback, integrated air pressure sensor, two analog temperature sensor, and four universal inputs software configurable as analog, binary, or accumulator) and nine output terminals (two internal triacs for actuator motor control, four external triacs, and three universal outputs). The controller-actuator 12 also includes jacks for communication with the controller-actuator 12, such as a 10/100BaseT Ethernet patch cable port 16, an EIA-485 port 18 (removable terminal block) for BACnet MS/TP communications, and a room sensor Modular STE connection jack/port 20. Differential air pressure ports 22 may also be exposed on the top cover 24 of the housing 26. LED indicator lights 28, such as for Power/status, MS/TP communication, and Ethernet status, may be on the outside of the housing 26. The controller-actuator 12 includes a V-clamp 30 outside the housing 26, for attaching to a damper stem or valve stem (not shown), rotationally driven by a motor (not shown) and gears (not shown) within the housing 26.

The circuit board 10 includes various prior art components for handling prior art functions of the controller-actuator 12 when operating under building power 15, such as a microprocessor 32 and memory chips 34 (which can include non-volatile memory such as either or both flash memory and/or read only memory, as well as volatile random access memory "RAM", all of which is only operable under building power 15). In addition, the circuit board 10 also includes spacers 36 for mounting an NFC antenna 38 immediately under the cover 24 of the housing 26. The circuit board 10 also includes an NFC communication integrated circuit and flash memory 40. The preferred NFC communication integrated circuit and flash memory is an ST Micro NFC enabled EEPROM part (M24LR64, Protocol: ISO 15693, DSFID: FF, AFI: 00, Memory: Number of block=2048, Number of byte of one block=04, IC Ref: 2C), along with a mating connector for hooking up to the antenna 38. The NFC EEPROM 40 from STMicro is a dual port device, having two ways of accessing the memory simultaneously (NFC and I$^2$C). This means that we can write (or read) the memory from the NFC RF side and read (or write) the same memory via the two-wire I$^2$C side through the microprocessor 32. The NFC antenna 38 is preferably mounted about ¼ to ½ inch below the housing cover 24, parallel to the housing cover 24. The housing cover 24 may include a notation 39 to designate the location of the NFC antenna 38, most preferably the center point of the NFC antenna 38.

Note that the preferred NFC memory 40 only has 8 kB of storage. This limited amount of storage is important in several aspects. First, less EEPROM memory reduces the component cost. Second and more importantly, the smaller memory size can be NFC transmitted in a shorter period of time, and with a lesser likelihood of error. However, the small NFC memory size also results in a reduced set of configuration parameters that can be stored, particularly if verification procedures are in place to ensure that the data is valid, complete and not corrupted. Further, due to the possibility of shorter or incomplete NFC transmissions and to minimize any resultant problems from shorter or incomplete NFC transmissions, the configuration parameters are stored in a particular order, further explained below.

Figure 3:
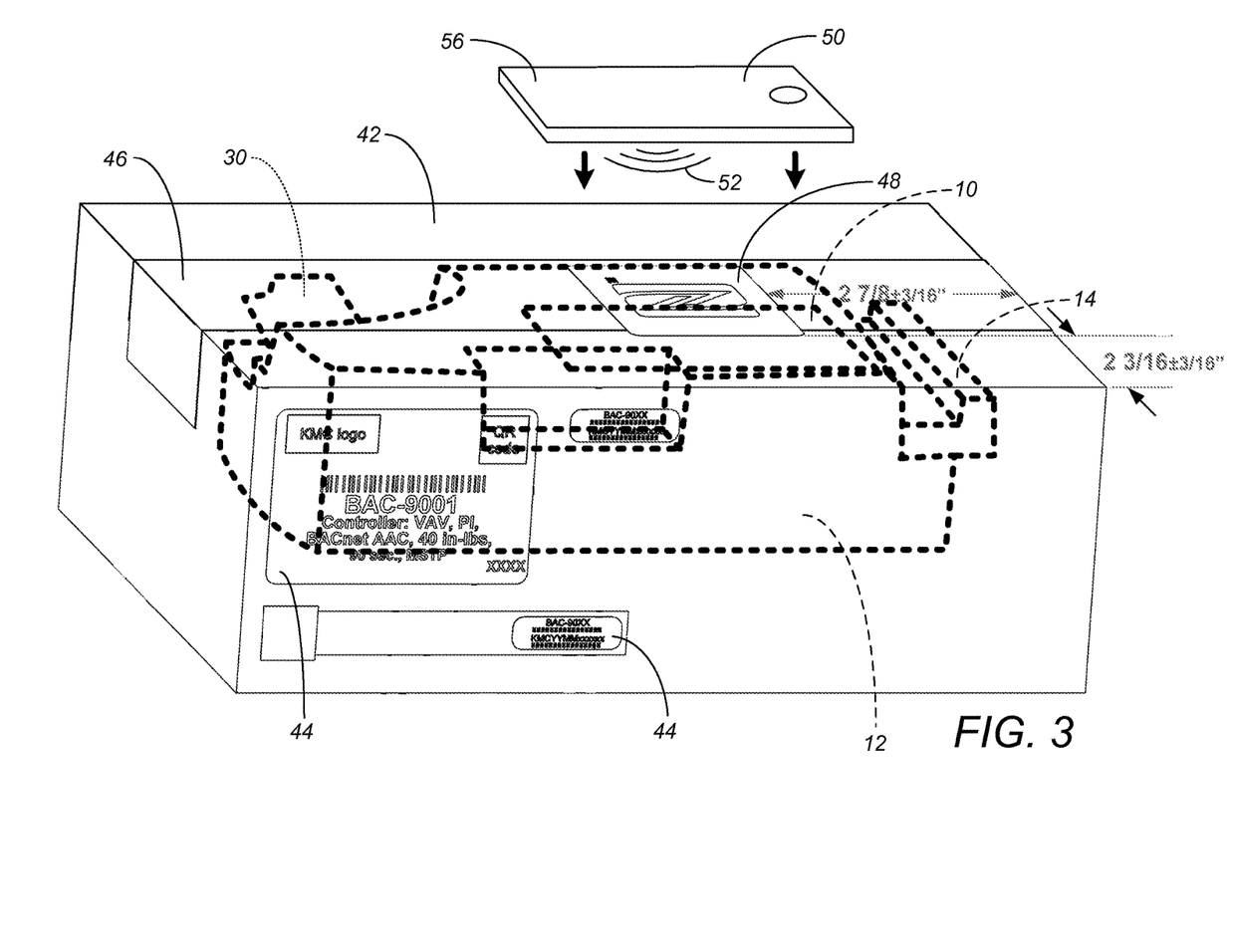
FIG. 3 is a perspective view showing a box containing the controller-actuator of FIG. 2, and showing a smartphone which can be used to configure the actuator in accordance with the present invention.

When the controller-actuator 12 is packed in a box 42, the controller-actuator 12 is supported so the housing cover 24 is immediately underneath a flat top surface of the box 42. The preferred box 42 is a corrugated cardboard carton, with the controller-actuator 12 supported and centered in the box 42 by a corrugated cardboard insert (not shown), and with the controller-actuator 12 and insert encased within a clear thin moisture protective plastic film (not shown). Additional carton labels 44 can be applied. The carton 42 is taped shut with shipping tape 46, and a 2×3 inch marking 48 is applied to the exterior of the box 42, generally opposite the side of the controller-actuator 12 with the V-clamp 30. With the preferred position of the NFC antenna 38, this means the 2×3 inch marking 48 is located 2⅞ inches from an end of the carton 42 and 2³⁄₁₆ inches from a side of the carton 42. This 2×3 inch marking 48 designates to a user the best location for placement of an NFC-enabled computing device 50 for communication with the controller-actuator 12 within the box 42, which is generally immediately over the NFC antenna 38 and within about one vertical inch of the NFC antenna 38. As shown, the marking 48 may include a symbol or icon widely used to designate NFC communications.

After the HVAC device 12 is packed and shipped, the user can initially configure the HVAC device 12 using a separately powered NFC-enabled computing device 50 and prior to even removing the HVAC device 12 from the shipping box 42. During the initial configuration process and as shown in FIG. 3, the separately powered NFC-enabled computing device 50 emanates an energy field 52, and the NFC antenna 38 harvests sufficient energy to receive a short communication, and to power and record the initial configuration data to the EEPROM NFC memory 40.

A custom software application runs on a PC, tablet or smartphone device 50 to gather and/or replicate information about the HVAC device 12 from the user. The software application assists the user in configuring the controller with specific information so as to improve the installation process, be it speed, accuracy or both. A more efficient installation process results in fewer mistakes and reduces costs associated with system installation and commissioning.

The preferred NFC configuration software application is further explained with reference to FIGS. 4-6. The preferred NFC configuration software application is made available via download 54 from the Internet onto the PC, tablet or smartphone device 50. The NFC configuration software application can be made considerably simpler than the full configuration software which can later be used after the HVAC device 12 has been provided with building power 15. The preferred NFC configuration software application has four basic function buttons which can be clicked on via a mouse or touchscreen 56, which include "Home" 58, "Read" 60, "Write" 62 and "History" 64 functions. Note that while the present application refers to NFC-enabled devices, computing devices that do not incorporate the NFC technology internally (i.e., APPLE products) can be NFC-enabled by connecting an external NFC wand, fob or dongle (not shown) to accomplish the configuration process.

Figure 4:
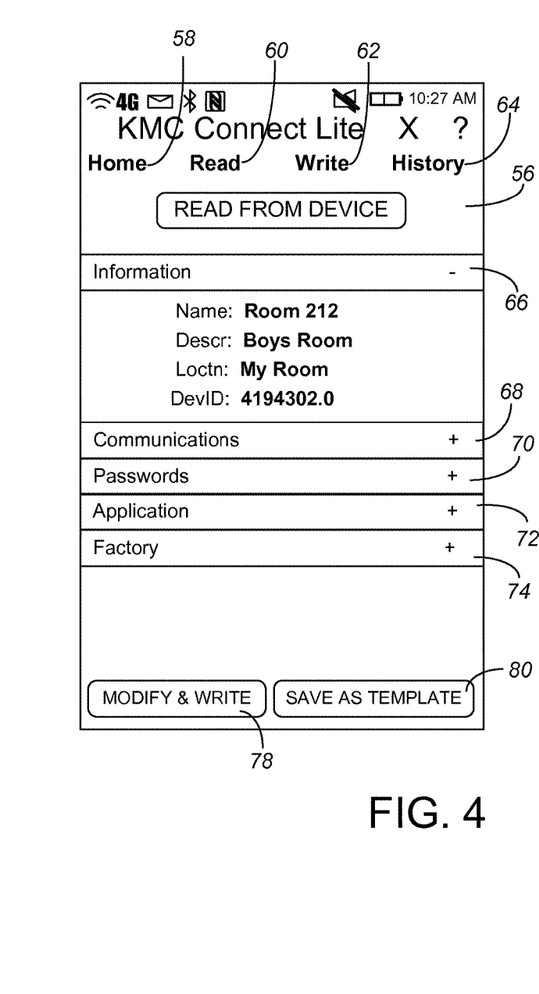
FIG. 4 is an exemplary software application screen for a smartphone for reading data from the actuator NFC EEPROM via NFC.

FIG. 4 shows an exemplary display provided on the smartphone 50 during the "Read" function 60. While FIGS. 4 and 5 show a smartphone display, it will be understood that similar software and displays (or more complicated software and displays) can be used for tablets or PCs. In the "Read" function, the smartphone 50 probes the controller-actuator 12 via NFC to obtain values in the NFC EEPROM 40 for certain configuration parameters stored there. If the controller-actuator 12 is still in the box 42 and has not yet been user-configured, the values for the configuration parameters are those default values recorded by the factory onto the NFC EEPROM 40. If the controller-actuator 12 has been previously user-configured, the values for the configuration parameters may be those from the previous configuration.

The configuration parameters which are stored on the NFC EEPROM 40 fall into five categories, namely, "Information" 66 (meaning device identification or naming information), "Communications" 68, "Passwords" 70, "Application" settings 72, and "Factory" 74 (meaning information which is recorded by the factory and can only be read, but not written, by the user using either wired communication or NFC). Any of these five categories 66, 68, 70, 72, 74 can be expanded by clicking on the "+" to show the values of the specific configuration parameters being stored. In the example shown in FIG. 4, the user has clicked to expand the "Information" 66 category, but not the other categories 68, 70, 72, 74. Four values have been read 76 from the NFC EEPROM 40 via NFC, namely in this example, a "Name" value of "Room 212", a "Description" value of "Boys Room", a "Location" value of "My Room", and a "Device ID" value of "4194302.0.". Two additional clickable buttons are presented at the bottom of the smartphone screen 56: a "Modify and Write" button 78 and a "Save As Template" button 80. If the user edits any of the values on the smartphone screen 56 and then clicks the "Modify and Write" button 78, the smartphone 50 will NFC transmit/write 82 the modified values to the NCF EEPROM 40. If the user clicks the "Save As Template" button 80, the NFC configuration software application will save the values as a template stored on the smartphone 50, for later use in populating or minoring values onto a different HVAC device.

Figure 5:
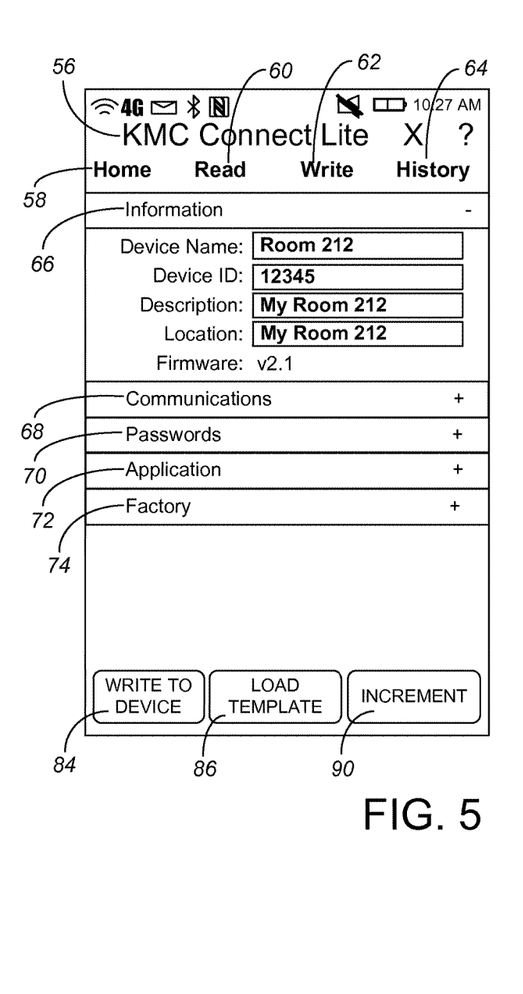
FIG. 5 is an exemplary software application screen for a smartphone for inputting data values to be transferred to the actuator NFC EEPROM via NFC.

FIG. 5 shows an exemplary display provided on the smartphone 50 during the "Write" function 62. Like the example of FIG. 4, the user in FIG. 5 has clicked to expand the "Information" category 66, but not the other categories 68, 70, 72, 74. Five values are prepared for NFC writing to the NFC EEPROM 40. Three additional clickable buttons are presented at the bottom of the smartphone screen 56. When the "Write to Device" button 84 is clicked, the smartphone 50 will NFC transmit/write 82 the values shown to the NCF EEPROM 40. When the "Load Template" button 86 is clicked, the smartphone 50 populates 88 all the shown fields with values from a previously saved template. Use 88 of templates can significantly reduce the amount of time required to configure numerous HVAC devices 12 such as for installation in the same building, with many values for configuration parameters being the same as the other devices 12. When the "Increment" button 90 is clicked, any highlighted field (such as the device ID number) will have its value incremented by 1. The increment button 90 helps when numerous HVAC devices 12 are being installed which should each be sequentially numbered in a field such as Device ID, MAC Address, IP Address or Name (if the Name ends in a number, such as "Room 212".

In more specificity with respect to the preferred embodiment, each of the five categories 66, 68, 70, 72, 74 of configuration parameters are written as independent JSON files. Examples of the five JSON files written below, noting that the various values can be changed via similar displays and buttons of the preferred NFC configuration software application running on the NFC-enabled PC, tablet or smartphone device 50.

```
{
  "Information":{
    "LastWritten":466708620,
    "p0":{"q":"Name","l":"Device Name","t":"s","s":"16","v":"Room
      212","oi":"123456","pi":"17"},
    "p1":{"q":"DevID","l":"Device ID","t":"i","v":"12345","mn":"1",
      "mx":"4194302","oi":"123456","pi":"17"},
    "p2":{"q":"p2","l":"Description","t":"s","s":"16","v":"My Room
      212","oi":"123456","pi":"17"},
    "p3":{"q":"p3","l":"Location","t":"s","s":"16","v":"My Room 212",
      "oi":"123456","pi":"17"},
    "f1":{"q":"FW","l":"Firmware","t":"s","v":"v2.1","oi":"123456",
      "pi":"17"}
  }
}
{
  "Communications":{
    "LastWritten":1234567,
    "p0":{"q":"p0","l":"Type","t":"e","v":"IP","e":["MS/TP","IP","Ene
      t"],"oi":"123456","pi":"17"},
    "p1":{"q":"p1","l":"APDU Timeout","t":"i","v":"3","mn":"1",
      "mx":"300","oi":"123456","pi":"17"},
    "p2":{"q":"p2","l":"MAC Addr","t":"i","v":"1","mn":"0",
      "mx":"127","oi":"123456","pi":"17"},
    "p3":{"q":"p3","l":"Baud Rate","t":"e","v":"Auto","e":["Auto",
      "9600","19200","38400","76800","115200"],"oi":"123456","pi"
      :"17"},
    "p4":{"q":"p4","l":"Default Rate","t":"e","v":"38400",
      "e":["9600","19200","38400","76800","115200"],"oi":"123456"
      ,"pi":"17"},
    "p5":{"q":"p5","l":"Max Master","t":"i","v":"127","mn":"1",
      "mx":"127","oi":"123456","pi":"17"},
    "p6":{"q":"p6","l":"Max Frames","t":"i","v":5,"mn":"1",
      "mx":"20","oi":"123456","pi":"17"},
    "p7":{"q":"p7","l":"IP Addr","t":"a","v":"192.168.1.11",
      "oi":"123456","pi":"17"},
    "p8":{"q":"p8","l":"Subnet Mask","t":"m","v":"255.255.255.0",
      "oi":"123456","pi":"17"},
    "p9":{"q":"p9","l":"Gateway Addr","t":"a","v":"192.168.1.1",
      "oi":"123456","pi":"17"},
    "p10":{"q":"p10","l":"UDP Port","t":"i","v":"47808","mn":"1",
      "mx":"65534","oi":"123456","pi":"17"},
    "p11":{"q":"BBMD","l":"BBMD Addr","t":"a","v":"0.0.0.0",
      "oi":"123456","pi":"17"},
    "p12":{"q":"p12","l":"BBMD Port","t":"?+0"i","v":"47808","mn":"1",
      "mx":"65534","oi":"123456","pi":"17"}
  }
}
{
  "Passwords":{
    "LastWritten":466708620,
    "p0":{"q":"p0","l":"Setpoint","t":"s","ss":"4","v":"0000","oi":"1
      23456","pi":"17"},
    "p1":{"q":"PSW2","l":"Configuration","t":"s","ss":"4","v":"0000",
      "oi":"123456","pi":"17"}
  }
}
{
  "Application":{
    "LastWritten":1234567,
    "f0":{"q":"f0","l":"Name","t":"s","v":"kv8007e","oi":"123456","pi
      ":"17"},
    "f1":{"q":"f1","l":"Descr","t":"s","v":"VAV Single Duct, Series
      Fan, Mod Reheat","oi":"123456","pi":"17"},
    "Temperature Setpoints":{
      "p0":{"q":"p0","l":"Min Clg","t":"i","u":"F","v":"72",
        "mn":"32","mx":"212","oi":"123456","pi":"17"},
      "p1":{"q":"p1","l":"Max Htg","t":"i","u":"F","v":"68",
        "mn":"32","mx":"212","oi":"123456","pi":"17"},
      "p2":{"q":"p2","l":"Occ Clg","t":"i","u":"F","v":"68",
        "mn":"32","mx":"212","oi":"123456","pi":"17"},
      "p3":{"q":"p3","l":"Occ Htg","t":"i","u":"F","v":"68",
        "mn":"32","mx":"212","oi":"123456","pi":"17"},
      "p4":{"q":"p4","l":"Unocc Clg","t":"i","u":"F","v":"68",
        "mn":"32","mx":"212","oi":"123456","pi":"17"},
      "p5":{"q":"p5","l":"Unocc Htg","t":"i","u":"F","v":"68",
        "mn":"32","mx":"212","oi":"123456","pi":"17"},
      "p6":{"q":"p6","l":"Changeover","t":"i","u":"F","v":"72",
        "mn":"32","mx":"212","oi":"123456","pi":"17"},
      "p7":{"q":"p7","l":"Differential","t":"i","u":"F","v":"4",
        "mn":"1","mx":"99","oi":"123456","pi":"17"},
      "p8":{"q":"p8","l":"Standby","t":"i","u":"F","v":"3",
        "mn":"1","mx":"99","oi":"123456","pi":"17"}
    },
    "System":{
      "p0":{"q":"p0","l":"K Factor","t":"i","v":904,"mn":"100",
        "mx":"9999","oi":"123456","pi":"17"},
      "p1":{"q":"p1","l":"Fan Type","t":"e","v":"Series",
        "e":["Parallel","Series"],"oi":"123456","pi":"17"},
      "p2":{"q":"p2","l":"Reheat","t":"e","v":"Modulating","e":["
        Modulating","Binary","Staged"],"oi":"123456","pi":"17"},
      "p3":{"q":"p3","l":"Damper Dir","t":"e","v":"CW",
        "e":["CW","CCW"],"oi":"123456","pi":"17"},
      "p4":{"q":"p4","l":"Min Clg Flow","t":"i","u":"CFM",
        "v":"100","mn":"0","mx":"999","oi":"123456","pi":"17"},
      "p5":{"q":"p5","l":"Max Clg Flow","t":"i","u":"CFM",
        "v":"400","mn":"0","mx":"999","oi":"123456","pi":"17"},
      "p6":{"q":"p6","l":"Min Htg Flow","t":"i","u":"CFM",
        "v":"100","mn":"0","mx":"999","oi":"123456","pi":"17"},
      "p7":{"q":"p7","l":"Max Htg Flow","t":"i","u":"CFM",
        "v":"400","mn":"0","mx":"999","oi":"123456","pi":"17"},
      "p8":{"q":"p8","l":"Min Fan","t":"i","u":"%",
        "v":"25","mn":"25","mx":"100","oi":"123456","pi":"17"},
```

-continued

```
    "p9":{"q":"p9","l":"Max Fan","t":"i","u":"%",
        "v":"100","mn":"25","mx":"100","oi":"123456","pi":"17"},
    "p10":{"g":"p10","l":"Aux Flow","t":"i","u":"CFM",
        "v":"200","mn":"0","mx":"999","oi":"123456","pi":"17"},
    "p11":{"g":"p11","l":"Override Tmr","t":"i","u":"min",
        "v":"60","mn":"1","mx":"999","oi":"123456","pi":"17"},
    "p12":{"g":"p12","l":"Standby Tmr","t":"i","u":"min",
        "v":"15","mn":"1","mx":"999","oi":"123456","pi":"17"},
    "p13":{"g":"p13","l":"DAT","t":"e","v":"No","e":["No",
        "Enable"],"oi":"123456","pi":"17"},
    "p14":{"g":"p14","l":"Auto Occ","t":"e","v":"No",
        "e":["No","Enable"],"oi":"123456","pi":"17"}
    },
    "Restore":{
    "p0":{"g":"FCTRY","l":"FACTORY","t":"e","v":"Single Duct
        [English]","e":["Single Duct [English]","Dual Duct
        [English]","Single Duct [Metric]","Dual Duct
        [Metric]","Single Duct [Mixed]","Dual Duct
        [Mixed]"],"oi":"123456","pi":"17"}
    }
  }
}
{
    "Factory":{
    "LastWritten":"0",
    "f0":{"g":"Model","l":"Model Number","t":"s","v":"BAC-90010E"},
    "f1":{"g":"HW ID","l":"Serial Number","t":"s","v":"123456789A"},
    "f2":{"g":"f2","l":"Ethernet MAC","t":"s","v":"00D06FDC0506"}
    }
}
```

As evidenced by these examples, these five JSON documents include:
"p#" parameters, which are allowed to be writable via NFC by the preferred NFC configuration software application;
"f#" properties, which are fields that are not allowed to be writable via NFC by the preferred NFC configuration software application
sub-sections, if present.
Each "f#" and "p#" property has several sub-properties, which are which are name/value pairs, as follows:
"q"="identifier". This is a unique identifier that can be used as a reference by the NFC configuration software application.
"l"="label". This is the name of the property to be shown on the preferred user interface/display of the smartphone 50. Its maximum length is fifteen characters.
"t"="type". This is the type of property. Acceptable values are:
"s"=a string;
"i"=integer;
"f"=floating-point decimal;
"e"=enumeration;
"a"=IP address, which is stored as a string but validated as an IP address. However, if the parameter's "q" identifier is "BBMD", then an address of 0.0.0.0 will be allowed.
"m"=subnet mask, which is stored as a string but validated as an IP subnet mask.
"s"="size". If the property type is a:
string, this is the maximum number of characters;
float, this the number of digits to be shown to the right of the decimal; 1
integer or enumeration, is not used.
"ss"="string size". This is the number of characters the string must have, no more and no less.
"u"="units". This is shown only if the property actually has units.
"v"="value". This is the value for this property, shown on the preferred user interface/display of the smartphone 50.
"mn"="minimum". This is the minimum value the software application will allow a user to enter on the preferred user interface/display of the smartphone 50 (used only with integers and floats). If the user attempts to enter a value for the property less than minimum, the preferred NFC configuration software application simply puts in the minimum.
"mx"="maximum". This is the maximum value the software application will allow a user to enter on the preferred user interface/display of the smartphone 50 (used only with integers and floats). If the user attempts to enter a value for the property greater than maximum, the preferred NFC configuration software application simply puts in the maximum.
"e"="enumeration". This is the list of valid enumerations, which are written as a JSON array of strings. On the user interface/display of the smartphone 50, these values are shown as a spinner or dropdown menu and are the only values from which the user may choose.
"oi"="object identifier". This is the BACnet Object Identifier for this property, which is the Object Type Identifier, shifted 22 bits to the left, and ORed with the Instance Number. This field is not displayed by the user interface/display of the smartphone 50.
"pi"="property identifier". This is the BACnet Property Identifier for this field or parameter. This field is not displayed by the user interface/display of the smartphone 50.

For the non-writable "f#" properties, only "l", "t", "v" and "x" name/value pairs are used. All strings are delineated by double-quotes before and after the string. A null character is not used to delineate a string. To keep the memory usage in the JSON document to a minimum, no white space is used except for far-left horizontal tabs, as shown in the examples above.

Workers skilled in the art familiar with BACnet objects will also understand that the "f#" and "p#" properties identified above as having sub-properties changeable during NFC configuration can also have other sub-properties which cannot be changed via NFC configuration but which may be changed after building power has been applied to the HVAC device 12. Examples of such sub-properties include:
a) The HVAC unit (Fahrenheit, Celsius, CFM, LPS) for that particular item;
b) The Name and Description for that property;
c) Other texts that are associated with BACnet objects that have a specific finite list of possible values (e.g., a Binary output can have the digital value of '0' and '1', but these have a textual value of 'Disable' and 'enable' that can be changed after building power has been provided but cannot be changed via NFC);
d) Manual override (a technician can force a parameter/object to have a particular run-time value, overriding the value assigned by the firmware in the HVAC device); and
e) Other sub-properties are specific to particular types of object/parameters. In contrast, the sub-properties which can be changed via NFC are preferably a subset of all of the sub-properties, which subset is focused on run-time default values for sub-properties.

The procedure performed by the user or installer in accordance with the present invention is further explained with reference to FIG. 6. Assuming a solid knowledge of current wired configuration of HVAC devices, the more limited process of NFC configuring an HVAC control device 12 in accordance with the present invention is fairly simple. The first actions taken by the user/installer include ordering and/or purchasing 90 one or more (often numerous) HVAC devices 12 which including the NFC capabilities of the present invention. Separately, the user/installer obtains an NFC enabled computing device 50 (such as a smartphone, tablet or PC), and then downloads (or otherwise acquires) and installs 54 the preferred NFC software application described above. Configuration of the HVAC device(s) 12 could proceed via a wired connection as in the prior art with power supplied to the HVAC device(s) 12, but more preferably will proceed via NFC. When the user/installer wants to perform the NFC configuration of the HVAC device(s) 12, the easiest method is to leave the HVAC device 12 in its labeled shipping box 42 and place the computing device 50 on the NFC label 48 while the software application is running. After populating the various fields of the display (and thereby the JSON documents) with the desired configuration parameter values, the user clicks either the "modify & write" button 78 or the "write to device" button 84 on the interface to NFC transmit and store the configuration parameter values in the NFC EEPROM 40. With the limited set of configuration parameters which are NFC transmitted 82 in the preferred embodiment, the actual transmission and storage step only takes a few seconds, even if all five JSON documents are used in the transmission, and takes even less time if less than all five JSON documents are transmitted. With the Information-then-Communications-then-Passwords-then-Application-then-Factory order of configuration parameters and the order of JSON files, if the transmission 82 is interrupted it will more likely affect the less-likely-to-be-changed parameters. After a first HVAC device 12 is configured, the user/installer can repeat the process to NFC configure any number of HVAC devices 12 being installed.

The user/installer can thereafter remove the HVAC device 12 from its shipping box 42 and install it in its place in the HVAC system, including providing the HVAC device 12 with building power 15. Further configuration parameters can then be stored on the HVAC device powered memory 34, such as schedules, trends etc. that would either be too large to store in the small NFC EEPROM memory space 40 or be too large/too slow for quick NFC transmission 82.

While the preferred methods being discussed involve NFC transmission 82 prior to supplying building power 15 to the HVAC device 12 and particularly while the HVAC device 12 is still in its shipping box 42, the usage is not so limited. The user can also or alternatively configure 82 or read 76 using NFC at any time after the HVAC device 12 has been removed from the shipping box 42 and at any time after building power 15 has been supplied.

A separate important aspect of the present invention is that a history file is written which includes all NFC transmissions to and from the NFC EEPROM 40. For this history file, the fields and their order transmitted/recorded are:
  action (i.e., "read" or "write");
  model (e.g., "BAC-8205", read from the Factory section 74);
  device name (from the Information section 66);
  device id (from the information section 66);
  serial number (the HW ID from the Factory section 74); and
  timestamp (number of seconds since the Epoch, for when the action was taken).

The history file is stored in the NFC EEPROM 40, and can be NFC read 76 by using the "History" tab 64 on the software user interface display.

Yet another important aspect of the present invention utilizes the concept of "templates" stored on the PC, Tablet or Smartphone device 50, noted with reference to the "Save as Template" button 80 of FIG. 4 and the "Load Template" button 86 of FIG. 5. When an installer reads 76 from a device 12 that is already configured for a particular HVAC Application, this can be stored as a "template" for later use. This way the installer can quit for the day and start back up later without having to re-read a device 12. Instead of re-reading from a device 12, the installer can simply look at the stored templates for that model.

One preferred method of using the present invention is to have the user/installer configure a first controller on a HVAC system via prior art methods, after power is separately provided to the first controller being configured, such as through a wired communication with a personal computer running a full configuration software application, or with a wallstat using its menuing system. The preferred full configuration software is CONNECT software from KMC Controls of New Paris, Ind., assignee of the present invention. When configuring with the preferred full configuration software application, the configuration can install any of numerous (approximately 150 or more) different preset forms which exist within a configuration library, which helps pick and load the correct form of configuration file for all of the BACnet objects which exist in the HVAC system. All subsequent controllers and devices on the HVAC system can be configured using the NFC software application and method described with reference to FIGS. 4-6. The programming/trends/schedules etc. are not configured by NFC, but rather are supplied as factory default settings when the device is ordered and shipped, or can later be transferred (mirrored) via communications with the original (CONNECT configured) device.

Figure 7:
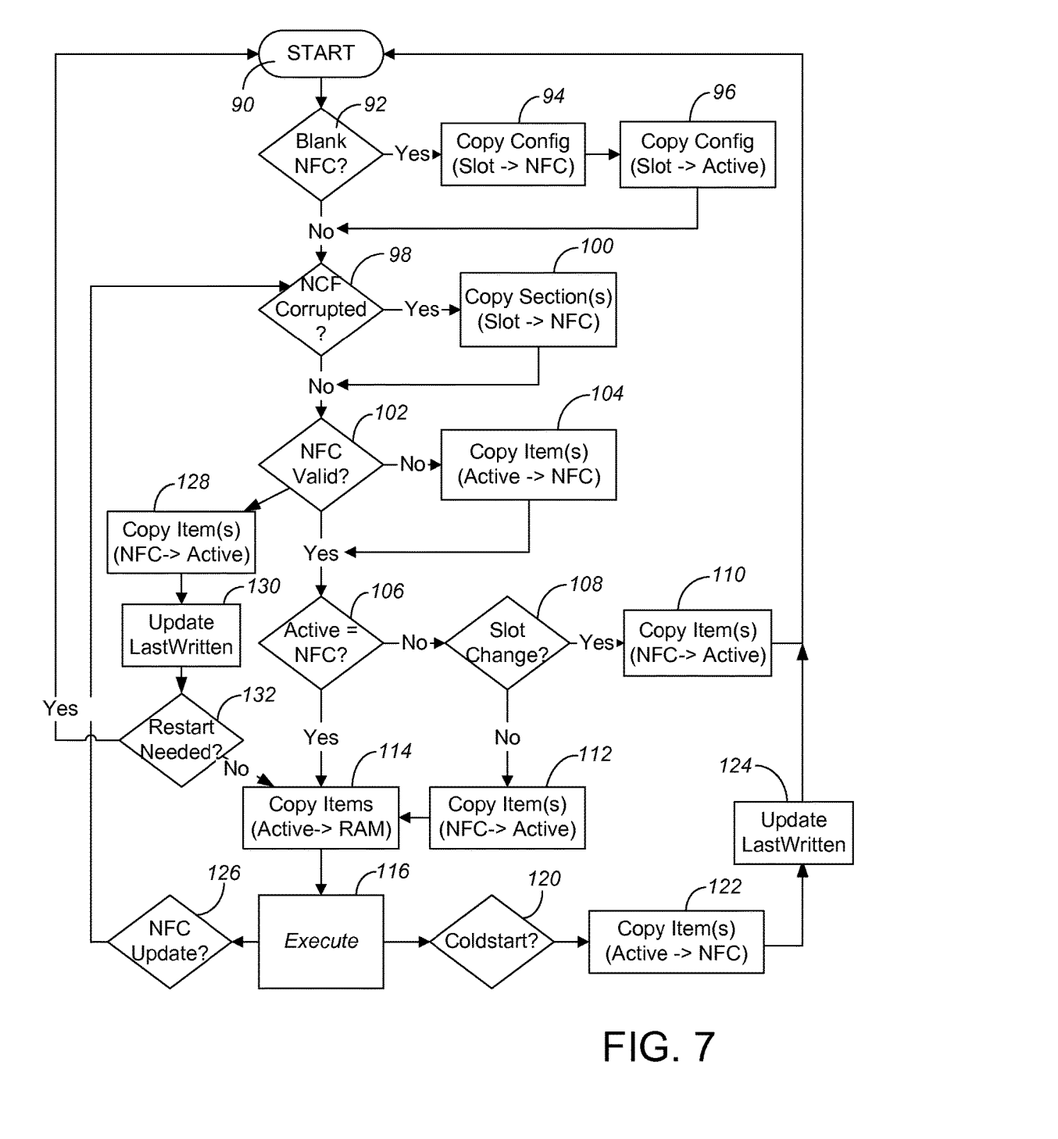
FIG. 7 is a second flow chart showing operation of additional steps added to the configuration firmware program upon applying building power to the initially configured HVAC device.

FIG. 7 is a flow chart showing the additional steps added to the initialization firmware on the HVAC device 12, which runs after building power 15 has been provided to the HVAC device 12 and the HVAC device 12 is powered up. While FIG. 7 shows a "Start" step 90, recognizing that these are only the additional steps added to prior art initialization firmware, there can be many other steps performed by the firmware on the HVAC device 12, either before, during or after the steps called out in FIG. 7 are performed. The computer code instructions for the initialization firmware are stored on powered non-volatile memory 34 (such as, in the preferred embodiment, flash memory) and executed by the microprocessor 32 under building power 15. Whenever appropriate for the start-up procedure, the first additional step 92 is to look and see if the NFC EEPROM 40 is empty. Usually this step 92 will be performed at the factory, prior to boxing the HVAC device 12, possibly as part of a quality control verification procedure which applies power to the HVAC device 12. If the NFC EEPROM 40 is empty, the next step 94 is to copy and transfer configuration parameter data from a default slot on powered non-volatile memory 34 to the NFC EEPROM 40. For instance, preferred HVAC devices include up to eight "slots" in flash memory 34 for default configuration parameters, as follows:

| Model | Slot 1 | Slot 2 | Slot 3 | Slot 4 | Slot 5 | Slot 6 | Slot 7 | Slot 8 |
|---|---|---|---|---|---|---|---|---|
| 5901 Controller | English | Metric | Default | | | | | |
| 9001 Controller-Actuator | VAV Single Duct PI, English | VAV Single Duct PI, Mixed | VAV Single Duct PI, Metric | VAV Dual Duct PI, English | VAV Dual Duct PI, Mixed | VAV Dual Duct PI, Metric | | |
| 9021 Controller-Actuator | VAV Single Duct PD, English | VAV Single Duct PD, Mixed | VAV Single Duct PD, Metric | | | | | |
| 9301 Controller | RTU, English | RTU, Metric | HPU, English | HPU, Metric | 4-pipe FCU, English | 4-pipe FCU, Metric | 2-pipe FCU, English | 2-pipe FCU, Metric |
| 9311 Controller | RTU, English | RTU, Metric | HPU, English | HPU, Metric | VAV (ext, actuator) Single Duct PI, English | VAV (ext, actuator) Single Duct PI, Mixed | VAV (ext, actuator) Single Duct PI, Metric | |

If one of these usage slots has been specified on the purchase order, then the factory will cause the microprocessor 32 to transfer the default configuration parameters from that flash memory slot to the NFC EEPROM 40. In no usage slot has been specified on the purchase order, or in cases where the purchase order/factory is not set up to handle such customization on a purchase-order-by-purchase-order basis, then the firmware will cause the microprocessor 32 to transfer the Slot 1 default configuration parameters to the NFC EEPROM 40. In any event, these default configuration parameter slots remain present on the powered non-volatile memory 34, so at any time that the HVAC device 12 has power, the user/installer can revert to any of the default configuration parameter slots.

The powered memory 34 on the HVAC device 12 has an "active" section for configuration parameters which will control operation of the HVAC device 12. The next step 96 in the firmware is to copy and transfer configuration parameter data to the "active" section.

The next step 98 performed by the initializing firmware is to check and see if the NFC EEPROM 40 configuration data is corrupted. Generally, this means checking the JSON documents stored in the NFC EEPROM 40 to see if they match with the rules specified above for those JSON documents such as for data format, bracketing, etc. Corruption of one or more JSON documents stored in the NFC EEPROM 40 would most commonly occur if the NFC transmission 82 of that JSON document was interrupted, causing the firmware to replace 100 the corrupted JSON document (such as the Information/Identifiers section) on the NFC EEPROM 40 with the corresponding default JSON document from the corresponding slot of the powered flash memory 34.

The next step 102 performed by the initializing firmware is to check and see if the NFC EEPROM 40 configuration data is valid. Generally, this means checking the values that have been stored for the various configuration parameters to verify that they are within an acceptable value range, such as within the minimum and maximum values specified above. If any of the configuration parameter values are invalid (such as the value for Device ID being above the maximum), the initializing firmware replaces 104 those items on the NFC EEPROM data with the corresponding item (such as the "Information—p0" line above) from the "active" profile.

The next step 106 performed by the initializing firmware is to check and see if the various values in the NFC EEPROM 40 configuration data match the values from the "active" section of configuration parameters in memory 34. If not, the next step 108 is to determine if the user has instructed a slot change, i.e., is or has used NFC to select a different slot of default configuration values. If a different slot has been selected, the initializing firmware copies 110 the configuration parameters from the NFC EEPROM 40 to the "active" section of configuration parameters in memory 34, and then begins the additional initializing firmware steps anew 90. If no different slot has been selected, the initializing firmware copies 112 the configuration parameters from the NFC EEPROM 40 to the "active" section of configuration parameters in memory 34 and then transfers 114 the "active" configuration parameters into RAM 34. The firmware then continues with execution 116, i.e., continues with standard, normal operations including wired or wireless communication 118 with other HVAC devices 12 as properly configured. Communications 118 after powering up the HVAC device 12 is directed by a different (non-NFC, prior art) communication chip using the "active" configuration parameter information which has been placed in RAM in powered memory 34.

During the execution mode 116, the firmware on the micro-controller performs many functions associated with HVAC control which are unaffected by the addition of the NFC capabilities of the present invention and which are not listed or discussed here. However, two functions in the execution mode 116 are modified to better incorporate the NFC capabilities. During the execution mode 116, the firmware identifies if the user has commanded 120 a "cold start" either using the CONNECT software or a digital sensor such as a netsensor. In a cold start 120, the programming/trends/schedules etc. stored in powered non-volatile memory 34 are preserved, but the firmware otherwise resets the microprocessor 32. In this cold start procedure, an additional step 122 has been added to ensure that the NFC EEPROM configuration parameters match the "active" configuration parameters which may have been commanded changed in the cold start. This cold start copying onto the NFC EEPROM 40 is also recorded 124 as part of the "lastwritten" values in the corresponding JSON document.

As a new logic sequence added to the firmware, the firmware will separately identify 126 when an NFC update is being performed after the execution mode 116 is running under building power 15. Any time the NFC configuration parameters are updated 126 during the execution mode 116, the firmware will perform the same corruption 98 and validity 102 checks of the updates as were performed during the initialization start-up, correcting either the section 100 or item 104 of configuration parameters necessary. Assuming all the data in the NFC EEPROM file passes the corruption 98 and validity 102 checks, the firmware then copies 128 any items which have been changed from the NFC EEPROM 40 to the "active" section of configuration parameters in powered memory 34. The firmware also updates 130 the "lastwritten" value in that section of the NFC EEPROM 40 for which any items have been changed. Finally, the firmware determines 132 whether the NFC update requires a restart, which occurs when the user has NFC commanded that a different pre-stored slot be used rather than separately change individual parameter values. If the NFC update does not require a restart, then the firmware resumes the execution mode 116.

One main use-case for the present invention is for the user/installer to change only the Information (Identifiers) and Communications parameters 66, 68 for each HVAC device 12 before installation, while each device 12 is still in its box 42. The user does not NFC configure parameters which are specific to the HVAC Application (72, and others) that will be running in the device 12.

Put another way, one sequence for configuration can be:
1. Each HVAC device 12 is pre-configured with an HVAC Application at the factory, per the purchase order.
2. The installer can use the present invention to easily change the values in the Information (Identifiers) and Communications configuration parameters 66, 68 that are required to be unique in order to connect these devices to a network.
3. CONNECT is then used to finish configuring the other parameters to anything other than factory-defaults.

Another common scenario is:
1. Each HVAC device 12 is pre-configured with an HVAC Application at the factory, per the purchase order.
2. The installer connects power to a first HVAC device and uses CONNECT software to configure the first HVAC device.
3. The installer then uses the NFC software application to easily change some or all of the configurable parameters for other devices that have the same type of HVAC application pre-loaded from the factory. The remaining parameters are mirrored from the CONNECT configuration of the first HVAC device after the subsequent devices have joined the HVAC network.

A third common scenario is:
1. Each HVAC device 12 is pre-configured with an HVAC Application at the factory, per the purchase order.
2. The installer can use the present invention to easily change the Information (Identifiers) and Communications parameters 66, 68 that are required to be unique in order to connect these HVAC devices to a network.
3. After installation and connecting power to all the HVAC devices, the installer uses CONNECT software to re-purpose some or all HVAC devices on the network to execute a different HVAC application (which has nothing to do with the Information (Identifiers) and Communications configuration parameters 66, 68).
4. The installer can also use CONNECT software, or the present invention, to set remaining configurable parameters.

The software application and the method of configuring includes several features that are distinctly different for NFC configuration of the present invention as compared to prior art wired configuration. Firstly, the NFC configuration of HVAC devices 12 can occur without providing any building power 16 to the HVAC device 12 during the NFC configuration process. Secondly, the NFC configuration method and application does not include loading of the specific configuration file including the programming/trends/schedules etc. and establishment of all of the BACnet objects on the system. These details are provided as factory-defaults when the device 12 is ordered, or can be mirrored onto the NFC configured device 12 later from the original (CONNECT configured) device, not through NFC configuration but rather via wired communication before or after the NFC configured device 12 is on the HVAC system. The NFC configuration data 66, 68, 70, 72, 74 and the associated NFC software application is accordingly simpler than the data and software used in prior art wired configuration. At the same time, the mirroring of programming/trends/schedules and similar details was not carried out as a subsequent step in the prior art.

Thirdly, the programming/trends/schedules and similar details data is stored in a different memory (the powered memory 34) on the device 12, rather than the more limited memory on the NFC EEPROM 40. The preferred method and devices include firmware on the device 12 which can mirror the NFC-transferred configuration parameters 66, 68, 70, 72 into the more spacious powered memory 34, so once the active section of the powered memory 34 receives the programming/trends/schedules and complete BACnet object file mirrored off the original CONNECT loaded device, the active, powered memory 34 contains a complete set of all configuration data.

Fourthly, the NFC EEPROM memory 40 is also separately set up (via the JSON application) to record and contain a history of NFC communications, such as with a date and time stamp of the most recent 100 NFC communications. Prior art systems included no history of configuration communications. Maintaining a history of NFC communications allows audit trail concepts to be applied to NFC communications, and further allows installers to distinguish between configuration instructions/data received by NFC and configuration instructions/data received via a wired (BACnet) connection.

Fifthly, the smartphone/tablet/pc software application includes the concept of "templates". When an installer reads from a device 12 that is already configured for a particular HVAC Application, this can be stored as a "template" on the smartphone/tablet/pc 50, with the preferred application allowing storage of up to 100 different templates. Any of these stored templates can be used later to NFC configure additional devices 12. This way the installer can be interrupted (for a few minutes or months or years) and start back up later without having to re-read from a previously read device 12. He or she can simply use stored template(s) for that model/HVAC system.

Sixthly, the present invention provides a completely different look and feel associated with NFC configuration programming via a mobile device or smartphone screen 56. The mobile device/smartphone screen 56 is at a detail level which is greater than the wallstat screen but lower than a personal computer screen running CONNECT.

Finally, because of this different look and feel, the configuration application allows users to more easily configure a subset of the total parameters needed to configure the devices 12, such as basic information (identifiers) and communications configuration parameters 66, 68. These can be copied from one HVAC device 12 to another very quickly with the software application, with the software application automatically changing or incrementing certain parameters to make them unique within the system. This automatic changing includes, but is not limited to, incrementing numerical identifiers and strings. Other configurable parameters, such as setpoints, will have default values from the factory which can readily be changed and copied from one device 12 to another using the NFC software application more easily than prior configuration methods. The present invention also greatly enhances the flexibility of updating configuration information at any point along the installation or commissioning process.

Although the present invention has been described with reference to preferred embodiments, workers skilled in the art will recognize that changes may be made in form and detail without departing from the spirit and scope of the invention.

The invention claimed is:

1. A method of configuring an HVAC device, the method comprising:
placing a separately powered NFC-enabled computing device within a vicinity of the HVAC device while running application software on the NFC-enabled computing device and prior to providing building power to the HVAC device, the HVAC device having an electronic memory and circuit for controlling a portion of an HVAC system, the electronic memory and circuit requiring building power for standard operation, the HVAC device having an NFC communication integrated circuit and antenna;
wirelessly communicating with the HVAC device using NFC controlled by the application software to transmit initial configuration information from the NFC-enabled computing device to the HVAC device prior to providing building power to the HVAC device, wherein the application software transmits initial configuration information in an order from most commonly modified by users to least commonly modified by users;
connecting building power to the HVAC device; and
within the HVAC device, using the building power to combine the initial configuration information into a firmware program running on the HVAC device to facilitate operation of the HVAC device and communication of the HVAC device and with other components of the HVAC system based on the initial configuration information.

2. The method of claim 1, wherein the HVAC device is a controller-actuator comprising a motor, for rotating a valve or damper in the HVAC system.

3. The method of claim 1, wherein the initial configuration information includes device information, wired communication parameters, password information, and HVAC application information, transmitted in that order.

4. The method of claim 3, wherein each of the device information, wired communication parameters, password information, and HVAC application information include a lastwritten item identifying a time stamp when that section of information was last written by NFC communication.

5. The method of claim 1, wherein the wirelessly communicating act occurs while the HVAC device is inside a cardboard box, and wherein the HVAC device is removed from the cardboard box prior to connecting building power to the HVAC device.

6. The method of claim 1, further comprising automatically maintaining a history of NFC communications separate from any history of wired communication.

7. A method of configuring an HVAC device, the method comprising:
placing a separately powered NFC-enabled computing device within a vicinity of the HVAC device while running application software on the NFC-enabled computing device and prior to providing building power to the HVAC device, the HVAC device having an electronic memory and circuit for controlling a portion of an HVAC system, the electronic memory and circuit requiring building power for standard operation, the HVAC device having an NFC communication integrated circuit and antenna, wherein the electronic memory comprises RAM and non-volatile memory, wherein the HVAC device comprises NFC EEPROM memory separate from the RAM and non-volatile memory, with both the RAM and non-volatile memory being powered and used for operation of the HVAC device only when building power is connected;
wirelessly communicating with the HVAC device using NFC controlled by the application software to transmit initial configuration information from the NFC-enabled computing device to the HVAC device prior to providing building power to the HVAC device;
connecting building power to the HVAC device; and
within the HVAC device, using the building power to combine the initial configuration information into a firmware program running on the HVAC device to facilitate operation of the HVAC device and communication of the HVAC device and with other components of the HVAC system based on the initial configuration information.

8. The method of claim 7, wherein the NFC EEPROM memory is pre-written with default configuration information prior to being at least partially overwritten with the transmitted initial configuration information.

9. The method of claim 8, wherein the NFC EEPROM memory comprises model number, serial number, Ethernet MAC address which cannot be overwritten via NFC transmission.

10. The method of claim 7, wherein the firmware program running on the HVAC device mirrors the NFC transmitted initial configuration information from the NFC EEPROM memory to the RAM.

11. The method of claim 10, wherein either the RAM or the non-volatile memory also stores additional programming/trends/schedules information recorded in the HVAC device as factory-defaults.

12. The method of claim 7, wherein the HVAC device is a controller-actuator comprising a motor, for rotating a valve or damper in the HVAC system.

13. The method of claim 7, further comprising automatically maintaining a history of NFC communications separate from any history of wired communications.

14. A method of configuring an HVAC device, the method comprising:
placing a separately powered NFC-enabled computing device within a vicinity of the HVAC device while running application software on the NFC-enabled computing device and prior to providing building power to the HVAC device, the HVAC device having an electronic memory and circuit for controlling a portion of an HVAC system, the electronic memory and circuit requiring building power for standard operation, the HVAC device having an NFC communication integrated circuit and antenna;
wirelessly communicating with the HVAC device using NFC controlled by the application software to transmit initial configuration information from the NFC-enabled computing device to the HVAC device prior to providing building power to the HVAC device, wherein the wirelessly communicating act occurs while the HVAC device is inside a cardboard box, wherein the cardboard box comprises one or more markings indicating a location for placement of the NFC-enabled computing device for best wireless communication with the NFC communication integrated circuit and antenna in the HVAC device;
connecting building power to the HVAC device, wherein the HVAC device is removed from the cardboard box prior to connecting building power to the HVAC device; and
within the HVAC device, using the building power to combine the initial configuration information into a firmware program running on the HVAC device to facilitate operation of the HVAC device and communication of the HVAC device and with other components of the HVAC system based on the initial configuration information.

15. The method of claim 14, wherein the NFC-enabled computing device is a smartphone, and wherein the markings are on a horizontal flat top of the cardboard box for setting the smartphone on the cardboard box during the wirelessly communicating act.

16. The method of claim 14, wherein the HVAC device is a controller-actuator comprising a motor, for rotating a valve or damper in the HVAC system.

17. The method of claim 14, wherein the application software transmits initial configuration information in an order from most commonly modified by users to least commonly modified by users.

18. The method of claim 14, wherein the electronic memory comprises RAM and non-volatile memory, wherein the HVAC device comprises NFC EEPROM memory separate from the RAM and non-volatile memory, with both the RAM and non-volatile memory being powered and used for operation of the HVAC device only when building power is connected.

19. The method of claim 18, wherein the NFC EEPROM memory is pre-written with default configuration information prior to being at least partially overwritten with the transmitted initial configuration information.

20. The method of claim 18, wherein the firmware program running on the HVAC device mirrors the NFC transmitted initial configuration information from the NFC EEPROM memory to the RAM.

21. The method of claim 20, wherein either the RAM or the non-volatile memory also stores additional programming/trends/schedules information recorded in the HVAC device as factory-defaults.

22. The method of claim 14, wherein the wirelessly communicating act occurs while the HVAC device is inside a cardboard box, and wherein the HVAC device is removed from the cardboard box prior to connecting building power to the HVAC device.

23. The method of claim 14, further comprising automatically maintaining a history of NFC communications separate from any history of wired communications.

24. A method of configuring an HVAC system, comprising:
configuring a first HVAC device via a wired and powered communication;
configuring a second HVAC device in two stages, a first stage prior to connection of the second HVAC device to building power, the first stage comprising transmitting initial configuration information to the second HVAC device via NFC communication; and a second stage involving mirroring trends/scheduler information from the first HVAC device to the second HVAC device via a wired communication between the first HVAC device and the second HVAC device in the HVAC system after building power has been provided to the second HVAC device, such that both the first HVAC device and the second HVAC are operating components of the HVAC system mounted in place in a building for controlling a portion of the HVAC system.

25. The method of claim 24, further comprising:
automatically maintaining a history of NFC communications to or from the second HVAC device separate from any history of wired communications to or from the second HVAC device.

26. An HVAC device comprising:
wiring for connecting building power to the HVAC device,
an electronic memory and circuit for controlling a portion of an HVAC system, the electronic memory and circuit requiring building power for standard operation;
an NFC communication integrated circuit and antenna;
an NFC memory powerable by the NFC communication integrated circuit and antenna; and
firmware stored in the electronic memory, the firmware including instructions for transferring initial configuration information stored in the NFC memory upon providing building power to the HVAC device, the firmware thereafter using the initial configuration information in communication within the HVAC system and operation of the HVAC system;
wherein the HVAC device is packed inside a cardboard box, and wherein the cardboard box must be opened in order to connect building power to the wiring, wherein the cardboard box comprises one or more markings indicating a location for placement of an NFC-enabled computing device for best wireless communication with the NFC communication integrated circuit and antenna in the HVAC device.

27. The HVAC device of claim 26, wherein the HVAC device comprises a circuit board within a housing, wherein the NFC communication antenna is mounted over the circuit board near a top of the housing.

28. The HVAC device of claim 26, wherein the HVAC device is a controller-actuator comprising a motor, for rotating a valve or damper in the HVAC system. communications.

* * * * *

UNITED STATES PATENT AND TRADEMARK OFFICE
CERTIFICATE OF CORRECTION

PATENT NO. : 10,006,654 B2
APPLICATION NO. : 14/939577
DATED : June 26, 2018
INVENTOR(S) : Randall L. Shaull et al.

It is certified that error appears in the above-identified patent and that said Letters Patent is hereby corrected as shown below:

In the Specification

In the Detailed Description of Preferred Embodiment(s), at Column 5, Line 12, delete "minoring" and insert therefore --mirroring--.

In the Detailed Description of Preferred Embodiment(s), at Column 14, Line 20, delete "minoring" and insert therefore --mirroring--.

In the Claims

In Claim 28, at Column 18, Line 58-59, delete "communications.".

Signed and Sealed this
Twenty-first Day of August, 2018

Andrei Iancu
*Director of the United States Patent and Trademark Office*